A. M. FRANKENBERG.
Electric Signal Apparatus for Telephones.

No. 235,424. Patented Dec. 14, 1880.

Fig. 1.

Witnesses:

Inventor:
pro Anthony M. Frankenberg
Atty.

A. M. FRANKENBERG.
Electric Signal Apparatus for Telephones.
No. 235,424. Patented Dec. 14, 1880.

Witnesses:

Inventor:
pro. Anthony M. Frankenberg
Atty.

A. M. FRANKENBERG.
Electric Signal Apparatus for Telephones.

No. 235,424.  Patented Dec. 14, 1880.

Witnesses:

Inventor:
pro Anthony M. Frankenberg,
Att'y.

A. M. FRANKENBERG.
Electric Signal Apparatus for Telephones.
No. 235,424. Patented Dec. 14, 1880.

Witnesses:

Inventor:
pro Anthony M. Frankenberg
Att'y.

A. M. FRANKENBERG.
Electric Signal Apparatus for Telephones.

No. 235,424. Patented Dec. 14, 1880.

Witnesses:
Floyd Norris
D. P. Cowl

Inventor:
pro Anthony M. Frankenberg
Johnson & Johnson
Associate Att'ys.

UNITED STATES PATENT OFFICE.

ANTHONY M. FRANKENBERG, OF BALTIMORE, MARYLAND.

ELECTRIC SIGNAL APPARATUS FOR TELEPHONES.

SPECIFICATION forming part of Letters Patent No. 235,424, dated December 14, 1880.

Application filed October 24, 1879.

*To all whom it may concern:*

Be it known that I, ANTHONY M. FRANKENBERG, of Baltimore city, in the State of Maryland, have invented certain new and useful Improvements in Electric Call or Signal Apparatus for Telephone and Telegraph Lines, of which the following is a specification.

I have made certain improvements in the art of transmitting sound and messages by the use of the telephone.

My invention embraces a system of district or other telegraphs or telephones in which the communicating-instruments of all the circuit-stations are entirely controlled in their functions or use and adjustments by means of a battery and a transmitter at the main or central station.

My object is to give complete control of all the instruments of the subscribers, whether such instruments are in or out of use, to the operator at the main station by means under his control. This, so far as I know, has never been done by any district or other telegraphy or telephone system.

By this complete control over the working of all the circuit-instruments by the operator at the main station all annoyances arising from neglect or inexperience of the subscribers in the use of their communicating-instruments are avoided, since there can be no derangement of such instruments, either by accident or design on the part of subscribers, that cannot be corrected from the main station by means there under the control of the operator in charge, for, while the subscribers have all necessary appliances for using their instruments, such appliances are nevertheless within the supreme control of the operator and his transmitter at the main station.

My invention also embraces a new organization by which any one bell or signal in an electrical circuit composed of a number of bells or signals can be rung or signaled without ringing or signaling the others, and by which any one of such stations can call or signal the main station without said call or signal being heard at any of the other stations on the line.

Under my central controlling system the operator at the main station can shunt out at will, by operating the mechanism at the circuit-stations, the push-buttons at all these stations, and by so doing he thereby prevents all interference with the operations of the mechanisms of the circuit-stations while said mechanisms are being operated from the main station for the purpose of allowing the central operator to call or signal any particular circuit-station. At the same time this mechanism operates a device by which the instrument is placed in condition to make ground-connections for the purpose of cutting off all stations beyond it and the main station, or all the stations between the main station and the circuit-station in communication with another circuit-station. While this has been done in the present system, yet it has objections in the fact that the operators at any of the circuit-stations may, by neglect or otherwise, put on or leave on this ground-connection, to the annoyance of those properly communicating; but by my central controlling system this improper use of the ground-connections is placed beyond the control of the circuit-stations by the ground-wires being under direct control from the central station, while being only under partial control by the circuit-stations for proper use. From the main station, under my new system, the operator there can cut off or disconnect the ground-wires of all the circuit-stations to restore the line to its normal condition for operation. This is made necessary in case the ground-wires of any one or more of these stations may have been left on by inadvertence or purposely, and thus not leave it solely under the control of the operator at the circuit-station, as heretofore done.

In the event of any derangement of the instruments my complete control from the main station allows all the instruments to be adjusted throughout the circuit by means of mechanism in the instruments at each circuit-station operated and controlled from the main station, and thus adjust all the instruments throughout the line to an initial point.

The complete central control of the circuit-instruments is obtained by means of a transmitter of novel construction, in connection with a single battery giving off three several distinct degrees of tension or power, or having the effect of three distinct batteries of different degrees of power, and in which the several degrees of tension are used for the purpose of effecting certain separate and combined results in the working of the telephone-circuit.

The transmitter, by its novel construction, has separate connection with each of the circuit-instruments through the battery by a corresponding number of push-buttons, all except one of which are used for ringing any of the call-bells at the circuit-stations, and in which the full force of the battery is brought into action. This single push-button is used to bring only a portion of the battery into action to place the instruments of all the stations to an initial point. The push-buttons of the circuit-station instruments are put in condition for calling or signaling the main station by means of the transmitter being brought in connection with that part of the battery giving the least of the three degrees of tension or power. The second section of the battery, or that part giving a degree of tension or power greater than that just mentioned, but less than the whole tension, is used for operating or controlling the working devices of the circuit-station instruments which operate the circuit-closers, while the ringing of the bell or giving a signal at any one of the stations is effected by combining the several degrees of tension of the battery and using them as a whole or single battery. I also use the combined tension of the battery for the purpose of working the mechanism of the circuit-instruments after all the instruments have been brought to the initial point.

Referring to the accompanying drawings.

To enable those skilled in the art to which my invention relates to construct and use my invention, I will proceed to describe the same in connection with the drawings which constitute part of this specification.

My invention not only comprehends a new transmitter, but a new organization of circuit-station instruments adapted for being operated by such transmitter.

Figure 1:
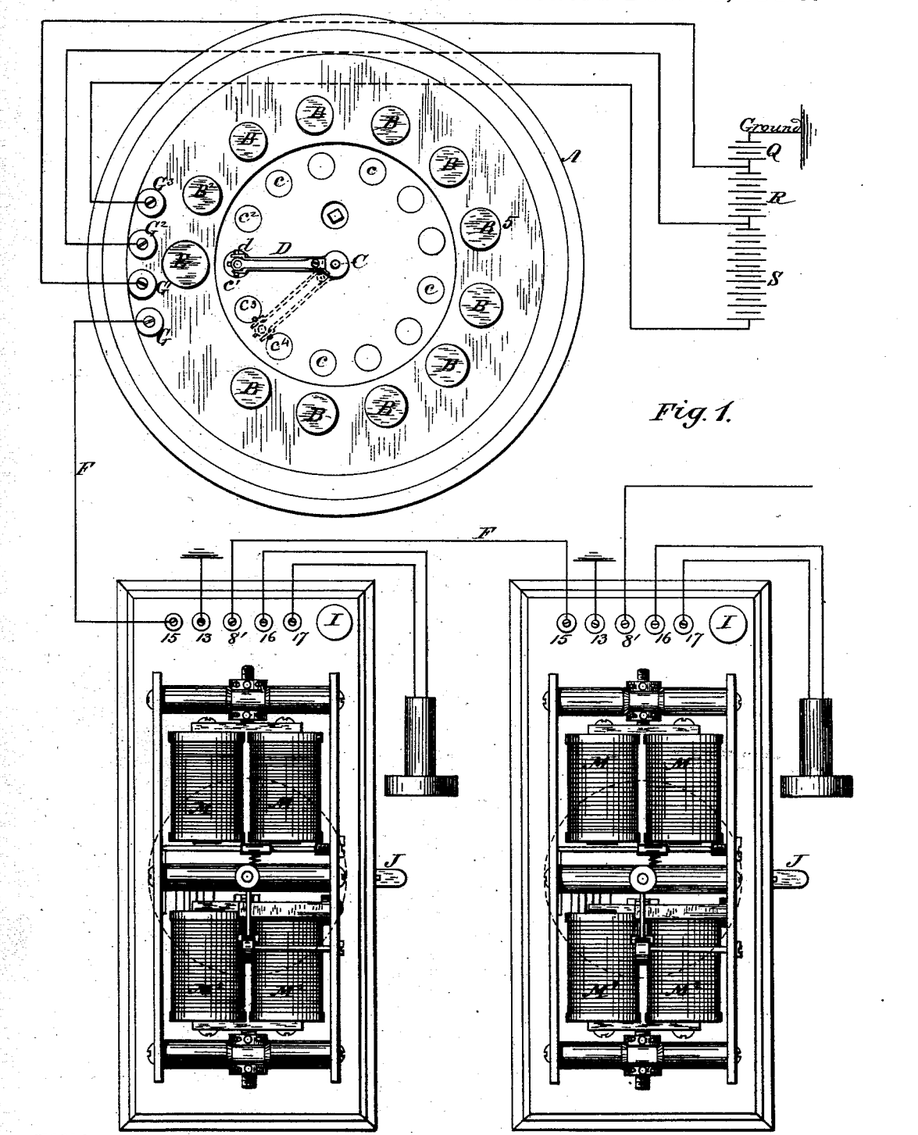
Figure 1 represents a top view of a transmitter used in the central or main station, with battery-connections and two of the communicating-instruments at two of the circuit-stations and a part of the telephone-line connecting these instruments with the transmitter at the main station.

In Fig. 1 of the drawings I have shown the transmitter in connection with two circuit-station instruments and a battery; and it will be understood that the transmitter is located at the central or main station, while the instruments are each located at stations within the telephone-circuit. It will also be understood that the transmitter is used, in connection with suitable appliances, such as switches, telephones, and an indicator, to show the condition of the instruments on the line at the main station; but as such appliances and their functions are well understood it is deemed unnecessary to describe or represent these things.

Figure 11:
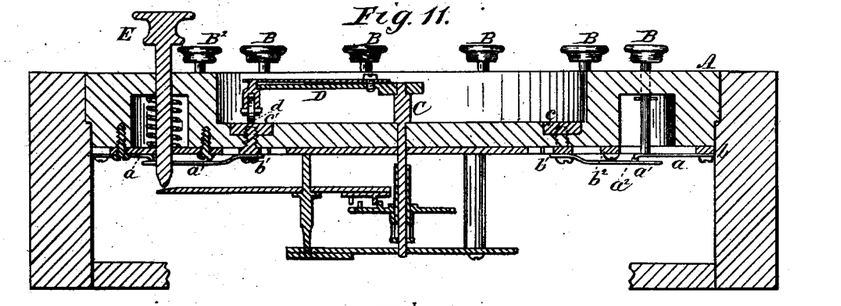
Fig. 11, a vertical section of the transmitter.
Figure 12:
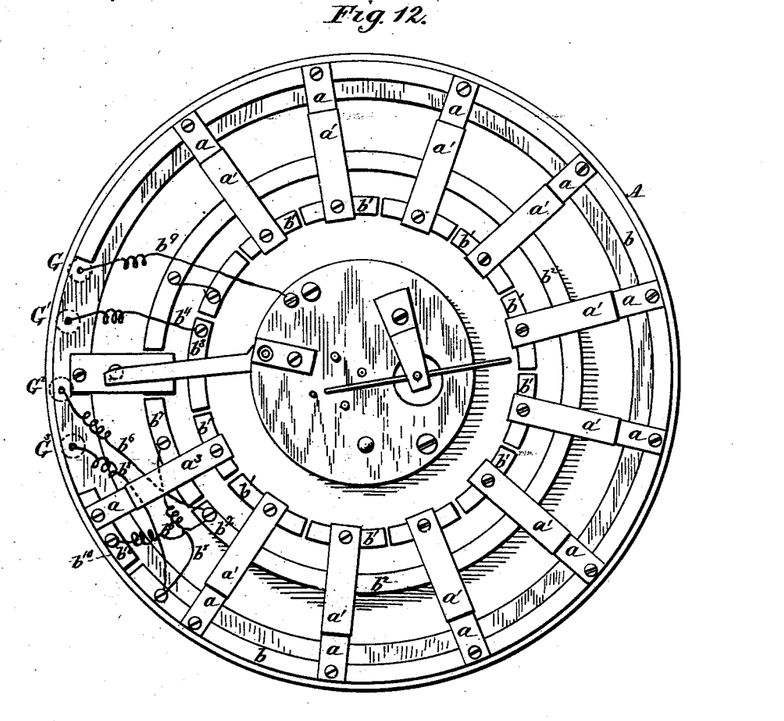
Fig. 12, a bottom view of the transmitter.

The operating devices of the transmitter are mounted upon a suitable carrier or support, A, and consist of a series of push-buttons, B, corresponding in number to the connected stations, and arranged for convenience in a circular form upon the upper face of the support, and with their stems passing through said support and pressing upon springs arranged radially upon the under side of said support, as shown in Figs. 11 and 12. These springs are in double sets, one, $a$, of each set being secured to a metallic segment, $b$, at or near the outer edge of the support, and extending inward, while the other spring, $a'$, of the set is secured to metallic segments $b'$, nearer the center of the support, and extends outward, so as to make a contact with an intermediate metallic segment, $b^2$, and to overlap the outer circle of springs, the free ends of which have contact-points $a^2$, Fig. 11, which are brought to bear upon the inner springs, $a'$, by pressing on the buttons B. The outer metallic segment, $b$, is connected with the entire battery and receives its full tension or power. The intermediate metallic segment, $b^2$, is connected with said battery and receives only a portion of its full tension or power, while the inner metallic segments, $b'$, are connected with metallic insulated disks $c$, arranged in a circle upon the upper side of the support, and for convenience within an annular recess therein.

A vertical central shaft, C, carries an arm, D, the outer end of which is provided with a roll, $d$, Fig. 11, which describes a circle as the shaft is revolved coincident with the insulated metallic disks, and is brought in contact therewith to make and break the circuit. For this purpose the arm D may be operated by hand; but a spring-and-gear motor may be used, by which the vertical shaft C and arm D are rotated, and which may be set in motion by means of a special push-button, E, which clock-work also serves as a stop to arrest the arm at the desired points. The connection of this horizontal revoluble arm with the line-wire F is made through the binding-post G and wire $b^9$, Figs. 1 and 12, to the motor or frame. I use one of these metallic insulated disks $c'$, Figs. 1 and 11, to form a connection, by the arm D, with that part of the battery having the least degree of tension or power by means of the metallic segment $b^3$ and the wire $b^4$, Fig. 12, leading to the binding-post $G'$, for the purpose of allowing the circuit-stations to call or signal the main station. The binding-post $G^2$, Figs. 1, 12, and 13, is connected to the intermediate segment, $b^2$, and to one of the outer ranges of the radial springs $a$ by the wires $b^6$, Fig. 12, for the purpose of working the mechanism, and by depressing the button $B^2$, Fig. 1, when the arm is passing over the unison-disk $c^2$, Fig. 1, it prevents the instruments from passing the unison-point; and while the arm is making one revolution over the disks it brings all the instruments that are out of adjustment to the initial point. This is done by the combined tension of the two sections of the battery having the least tension or power.

Figure 13:
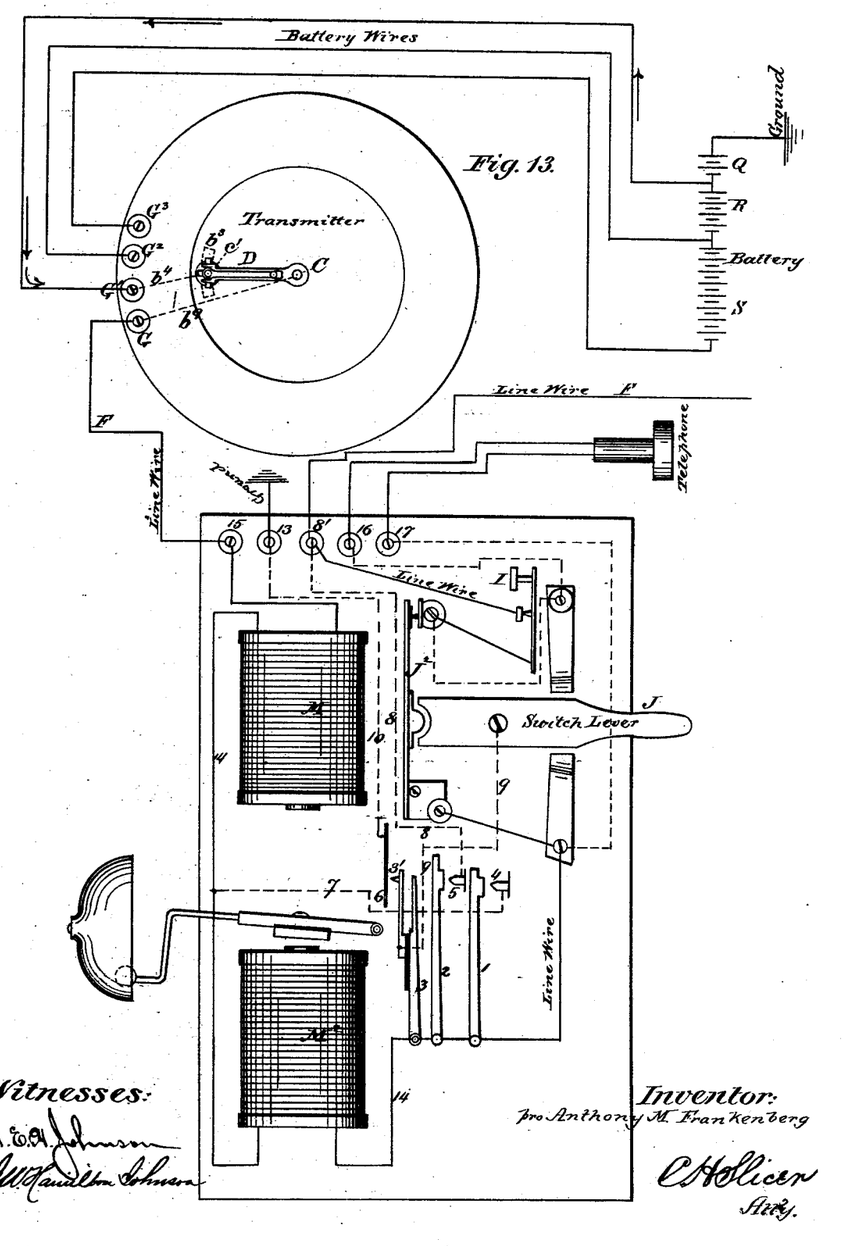
Fig. 13 represents a diagram showing the different wire-connections in a circuit-instrument in connection with a transmitter and battery at the main station by means of the line.

The circuit for allowing the circuit-stations to call the main office is made from any one of such stations through the line-wire F, Fig. 13, to the transmitter-post G at the main station, passing thence to the revolving arm D, through its post C, and through the disk $c'$ to the segment $b^3$ and the wire $b^4$ to the binding-post $G'$, thence to that section Q of the battery having the least tension or power.

The circuit-connection for propelling the mechanism in any one of the call apparatus at the circuit-stations is made from the battery-sections Q and R to the binding-post $G^2$, through the wire $b^6$, Fig. 12, to the segment $b^2$, thence, by the contact-springs $a\ a'$, to the segments $b'$, which connect with the disks $c$, which are brought into connection with the main line F through the arm D, its post C, the wire $b^9$, to the binding-post G, Fig. 12.

The fourth binding-post, $G^3$, is connected to the outer segment, $b$, by the wire $b^3$ for ringing the bells, and is also connected to the segment $b^7$, Fig. 12, by the wires $b^8$, and the inner spring, $a^3$, rests on said segment $b^7$ for the purpose of ringing the bells or giving the signals and causing the mechanism of the circuit-instruments to pass the initial points, and thus place all the instruments in condition for operation by means of the combined tension or power of the whole battery.

In operating this transmitter the depression of the buttons B brings the lip $a^2$ of the upper spring, $a$, against the lower spring, $a'$, which being thus pressed down breaks the contact of the inner spring with the intermediate segment, $b^2$, and makes the connection with the entire battery to give the signal at any particular station.

In the normal condition of the transmitter the rotatable arm D stands upon the metallic disk $c'$, as shown in Figs. 1 and 11, which is in connection with that portion of the battery having the least degree of tension, and this is the condition to allow the circuit-stations to call the main office. The position of this arm D (shown in dotted lines in said Fig. 1) is the point at which all the instruments throughout the line are in condition to make the ground-connections—that is to say, such position of the arm D is between the disks $c^3\ c^4$, and is thus out of the circuit which disconnects the line-wire from the batteries. The main line is then switched to the telephone at the main station by means of a switch, (not shown, but such as is used in telephone systems,) thus placing all the instruments throughout the circuit in position to make their ground-connection.

The push-buttons B and the circuit-making disks $c$ will be properly numbered to correspond with the number of stations.

Having described the controlling-instrument and its connections with the battery of the main station, I will now describe the communicating circuit-instruments, the functions of which are entirely controlled thereby. These instruments are provided with the ordinary call-bells, their operating electro-magnets, and telephones. Each of these instruments is provided with mechanism for operating the circuit-closers and a unison device, the latter bringing all the instruments to an initial point. This mechanism is operated by an electro-magnet, M, by means of the armature H, and consists of circuit-closers 1 2 3, one end of each of which is hinged with their free ends extending over insulated contact-points 4 5 6, Figs. 7, 8, and 13, secured to a sill. One of these insulated points, 4, acts with the circuit-closer 1 to shunt out the bell-magnet $M^2$ by the wire-connection 7. (Shown in Figs. 7, 8, and 13.)

Figures 2, 2A:
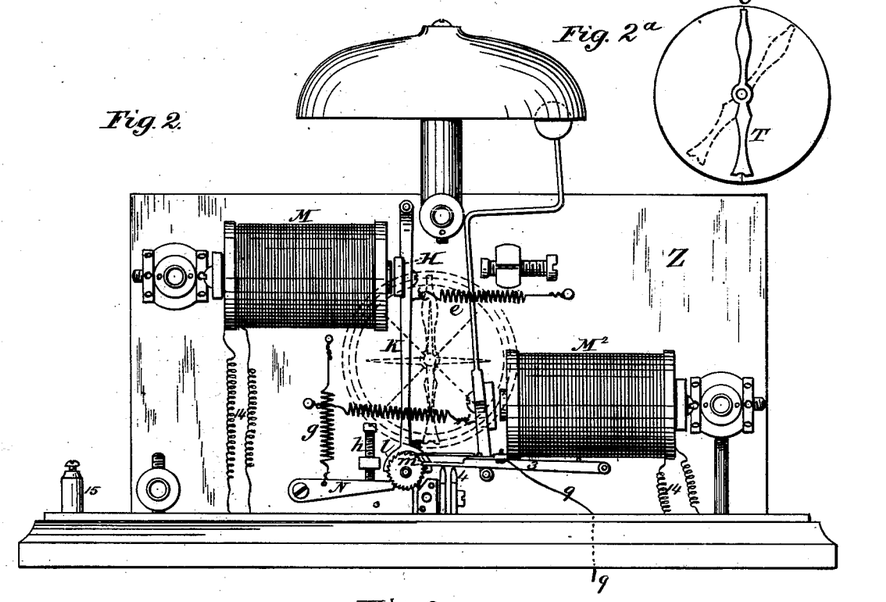
Fig. 2 represents a side elevation of one of the call or circuit-station instruments, one of the side plates being removed.
Figure 4:
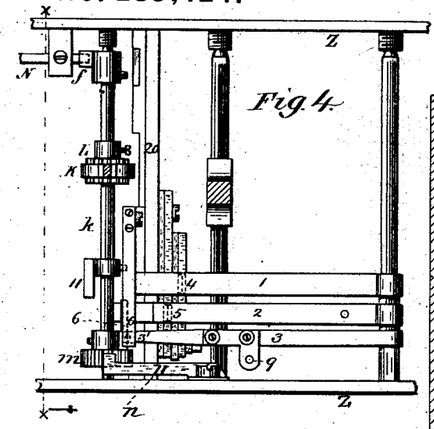
Fig. 4 represents a top view of the mechanism for operating the circuit-closers and a part of the device for operating the unison for bringing all the circuit-station instruments to an initial point.
Figure 7:
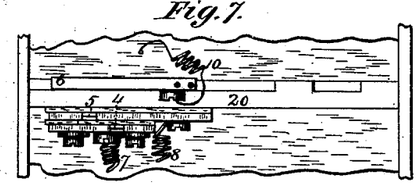
Fig. 7, a detail top view of the insulated contact-points for the circuit-closers.
Figure 8:
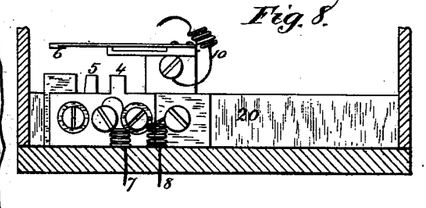
Fig. 8, a detail front view of the parts shown in Fig. 7.
Figure 9:
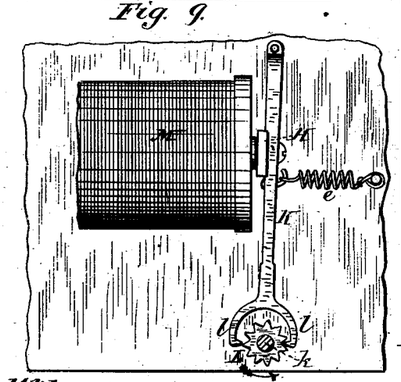
Fig. 9, a detail side view of the device for operating the driving-shaft of the mechanism.

The circuit-closer 2 acts with the insulated point 5 to shunt out the push-button I of this instrument by means of the wire 8 and the binding-post 8', Fig. 13, and a third circuit-closer, 3, connects with the lever J of the switch by the wire 9, as in Figs. 2, 4, and 13, and acts with an insulated contact-point or spring, 6, of the sill 20, for the purpose of making the ground-connection by the wire 10, Figs. 7, 8, and 13. These circuit-closers are operated by a tappet-shaft, k, mounted parallel with the sill in bearings in the side plates of the instruments, the tappets being arranged to operate said circuit-closers at certain points.

Figure 5:
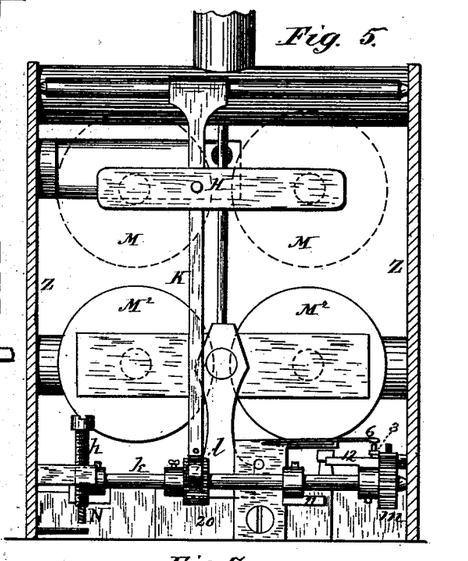
Fig. 5, a cross-section of the instrument, taken on the line $x$ $x$ of Fig. 4.
Figure 6:
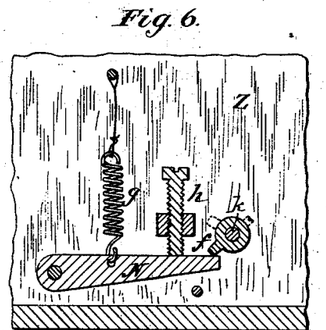
Fig. 6, a detail side view of the unison device.
Figure 10:
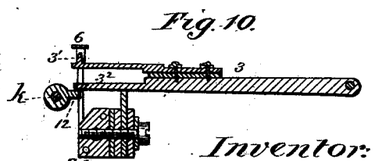
Fig. 10, a detail of one of the circuit-closers for making the ground-connection.

The tappet 11, Figs. 4 and 5, as the shaft is revolved, lifts the circuit-closer 1 from its insulated contact-point 4 and puts the bell-magnet $M^2$ in the circuit and in condition to ring the bell. The tappet 12, as the shaft is revolved, lifts the circuit-closer 2 to separate it from its insulated contact-point 5, and allows the push-button I and telephone to be placed in the circuit. This last-named tappet 12 also lifts the circuit-closer 3 to bring its insulated point 3', Figs. 10 and 13, in contact with the insulated contact-point or spring 6 to make the ground-connection through the wire 10 to the binding-post 13, Figs. 1 and 13. It will be seen that, while this tappet 12 lifts these two circuit-closers 2 and 3 at the same time, it does not release or drop them at the same time, by reason of their unequal length. The short one, 3, by its short arm $3^2$, being the first to fall, the push-button I is thereby kept in circuit after the ground-connection is broken, while the longer circuit-closer 2 is held up a somewhat longer time to keep the push-button I and telephone in circuit while the arm D of the transmitter is passing to a point to throw off the ground-wire 10 and connect the battery of the least tension with the line, for the purpose of allowing the main station to be called.

The point at which the ground-wire 10 is thrown off from the main line is the disk $c^3$, Fig. 1, and it is while the arm D is passing from disk $c^4$ to disk $c^2$ that the circuit-closer 2 is held up to keep the telephone and the push-buttons I in the circuit; otherwise these parts would be shunted out.

The circuit-closers connect with the line F by the metallic frame Z of the instrument, while they also connect with the electro-bell magnet by the wire 14, Fig. 13, while both magnets connect with the line by the wire 14 and binding-post 15, Figs. 1 and 13.

The operation of the circuit-closers which I have just described is effected by means of a driver consisting of a lever, K, carrying the armature H, and terminating at its lower end in a forked or segmental pawl, l, adapted to embrace and engage with a toothed wheel, L, on the tappet-shaft k and cause it to revolve by the vibrations of the lever K, produced by the action of the electro-magnet, the armature, and an adjustable retracting-spring, e, Fig. 2.

In this action the lever acts as a double pawl and pulls and pushes at each vibration of the lever, and thus revolves the tappet-shaft.

To prevent the tappet-shaft from turning backward under the vibrating action of the driver, it is provided with a ratchet-wheel, m, into which a check-pawl, n, Fig. 4, on one of the side plates engages. The number of teeth in this ratchet must be double that of the toothed wheel L, in order to hold the tappet-shaft in position after each vibration of the driving-lever, which is pivoted above its connection with the armature, as shown in Fig. 2. The unison is effected by this tappet-shaft k by means of a third tappet, f, adapted to act upon the end of an arm, N, pivoted to the side plate and constantly pulled upward by an adjustable spring, g, against an adjustable set-screw, h, so that as the tappet-shaft is revolved by the action of the armature H and the retracting-spring e this tappet f is brought against the free end of said pivoted arm N, and is thereby arrested, and as that part R Q of the battery by which this is effected has not sufficient power to cause the tappet to pass said arm, the initial point of all the instruments of the circuit is in this way effected. In order to pass this point the entire tension of the battery S R Q is brought into use.

I have described the tappet 11 as operating the circuit-closer 1; but it will be understood that the position of this tappet can be adjusted on its shaft so as to cause it to raise the circuit-closer to suit the instrument at any station corresponding with the number of the insulated disks. For example, this tappet is shown as set for a particular station—say number 5—but it may be adjusted for any other station. The bell and the electro-magnet $M^2$ for ringing the same are arranged and operated substantially as is ordinarily done.

Figure 3:
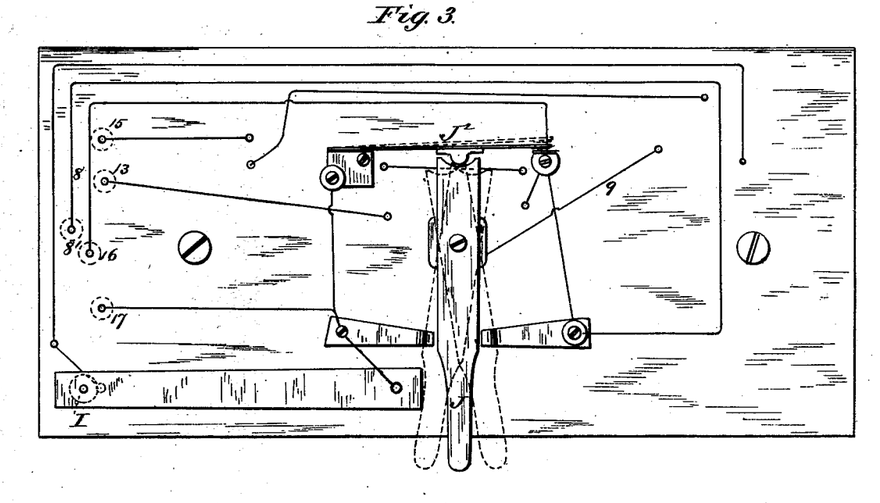
Fig. 3, a bottom view, showing the switch for cutting in the telephone and putting on the ground-wire and the working-wire connections.

Referring to the manner in which I effect and control the ground-connections, it is important to observe that the circuit-closer 3 is brought into action to make the contact at a certain time—that is, while the tension of the spring e is actuating the driving-arm and revolving the tappet-shaft—and that at this time all the instruments are placed in condition to enable them to make a ground-connection by means of the switch shown in Figs. 3 and 13. At the next attraction of the armature the tappet-shaft will be revolved and releases the circuit-closer 3, and thereby breaks the ground-connections at the stations and puts the line in a normal or perfect working condition.

Should any of the switches of the stations be left on, all the instruments can be brought to a point where the line may be used for telephoning without the use of the ground-wires. I mean by this that the line-wire F is brought to a perfect working condition by bringing the revolving arm D in contact with the disk $c^3$, and that this has the effect of putting on the working-battery Q R, and thereby moves the tappet-shaft k forward and releases the circuit-closer 3, and thus disconnects the ground-wire 10, Fig. 13, from each of the circuit-instruments, as already described.

To use the telephone at any station the switch-lever is shifted to the right or to the left, as shown by dotted lines in Fig. 3, to raise the circuit-closer $J^2$, Figs. 3 and 13, which cuts in the telephone and puts on the ground-wire, and the communication is made the same in either direction, the telephones being shown in their proper connection with the instrument by the binding-posts 16 and 17 and the proper wires, as shown in Figs. 1 and 13.

I have stated that a single battery having different degrees of tension or power is used in connection with my transmitter and call apparatus, and, as shown in Figs. 1 and 13, the several degrees of tension are designated by the letters Q R S, with which the transmitter-wires are separately connected, and in which the section marked Q has the least tension. The section R includes the tension of Q, and S includes the whole force, and thus lessens the expense of obtaining power; and while I prefer this construction, yet I do not wish to confine myself to such form, but may use three separate batteries.

There is arranged upon the side of each station-instrument, in close proximity to the electro-magnet M, a magneto-indicator, as shown by dotted lines in Fig. 2, under the influence of the electric current passing through the electro-magnet M, which indicates whether the line is in use.

It will be understood that when the line is used for telephoning the battery at the main station is disconnected. The needle T will then point to O, showing that the line is in use; but when the battery is connected to the line the needle will be deflected from O, which indicates that the line is not in use. This indicator is shown in Fig. 2$^a$, Sheet 2.

In operating from the central station to call, say, No. 5, the operator presses on the push-button which will be numbered $B^5$, Fig. 1. This puts on the whole battery. The arm D is then released by pressing on the button E, or revolved by hand, causing it to pass over the insulated disks $c$, and thereby opens and closes the line or circuit, and in passing $B^5$ causes the bell to be rung at that station. This being done, the arm D is carried to the insulated disk $c'$ to receive the reply from the local station, after which the arm D is again carried round to the insulated point (shown by dotted lines in Fig. 1) to place all the instruments in condition to use the ground-wire. The movement of the arm D is effected by clock-work connected with its post C, said arm being controlled in its movements by the push-button E, Fig. 11; but such clock-connection may not be used, as it is obvious that said arm may be moved as required by hand to use the ground-wire, as described, and for all the purposes for which it is intended. The telephone is then switched in at the main and circuit stations, and the two can communicate by telephone. After this is through the line is again switched to the transmitter and the arm D carried to the disk $c'$, and in doing so disconnects the ground-wires of the circuit-stations, leaving the line in its normal condition. This disconnection of the ground-wire is made by bringing the arm D in contact with the disk $c^3$, Fig. 1, which, as before stated, connects the working-battery Q R with the line, thereby moving the tappet-shafts of all the station-instruments forward one tooth, and thereby releasing the circuit-closer 3 and breaking the ground-connection.

In making a revolution over the insulated disks the arm D, in passing from one insulated point, $c$, to the others, opens and closes the circuit, as stated, and by so doing operates the mechanisms of the circuit-stations, and thereby cuts out the push-button at each of these stations, and thereby prevents all interference with the line, thus giving complete control of the whole system to the operator at the main station. In this operation of the revolving arm D all the push-buttons I of the circuit-stations are shunted out after the arm D is moved beyond its normal point, which is the disk $c'$, and which connects the small battery Q, to allow all the outlying stations to call or signal the main office without disturbing the mechanisms of any such stations, as before stated.

In Fig. 13 I have represented the relative electrical relation of the disks $c'$ with the segment $b^3$ and the binding-post $G'$ by the wire $b^4$, by which the smallest battery, Q, is brought in connection with the main line F, for the purpose of allowing any of the circuit-stations to call the main station without disturbing the mechanism of any of the circuit-stations, and this battery is used singly exclusively for this purpose, and the position of the arm D in said figure indicates the point at which such battery-connection is made with the main line, and at which any of the stations can call in. The battery-wires and the line-wire F are shown in their proper relation and connection with the disk $c'$ and the rotating arm by the wire $b^9$, connecting the shaft of said arm with the binding-post G.

Figure 14:
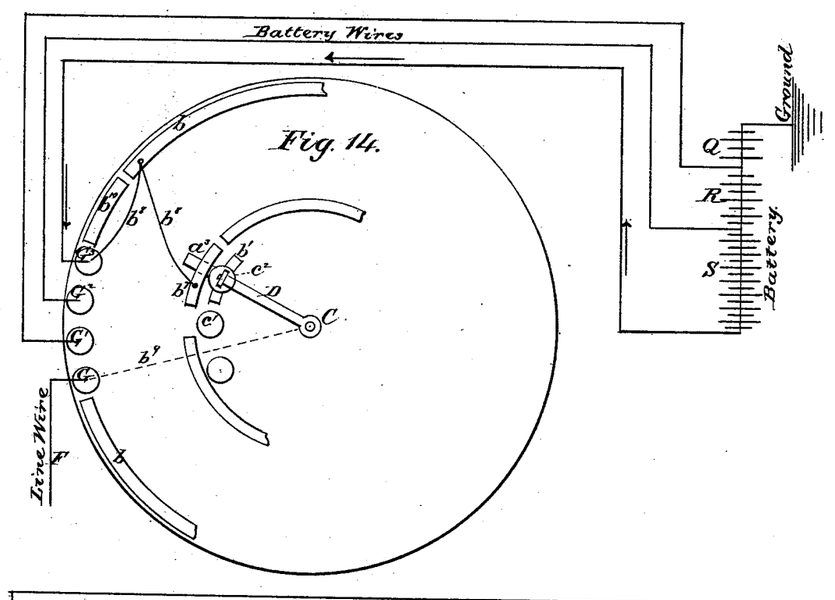
Fig. 14 represents, in diagram, so much of the transmitter as shows the relative electrical relation of the disk $c^2$, the rotating arm D, the segments $b'$, $b^7$, and $b$, the spring $a^3$, and the binding-post $G^3$, as illustrating the connection of said disk and main line with the full battery for passing the tappet-shafts $k$ of the circuit-station instruments beyond the unison-point.
Figure 15:
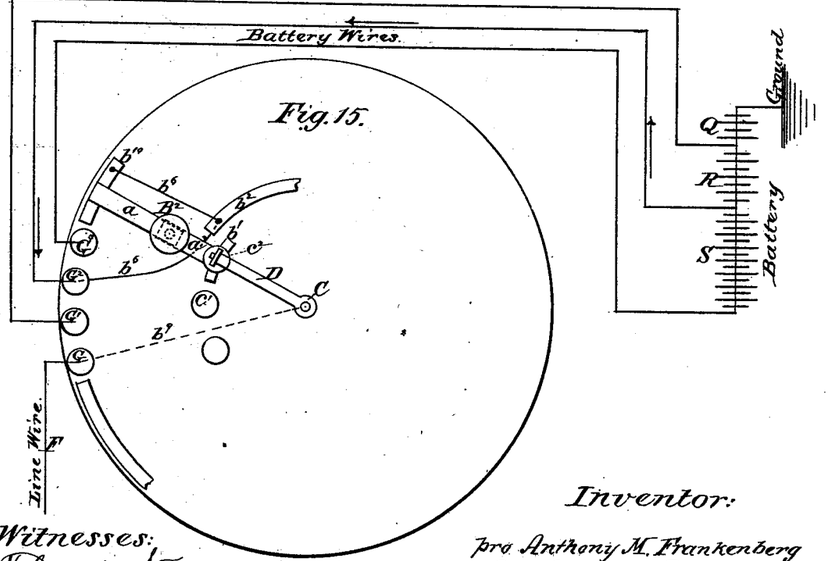
Fig. 15 represents a similar view, showing the electrical relation of the same parts in connection with the segments $b'$, $b^2$, and $b^{10}$, the springs $a$ $a^3$, and the binding-post $G^2$, as illustrating the connection of the disk $c^2$ with the working battery-sections Q R by the button $B^2$ for bringing all the instruments to the unison-point.

In Fig. 14 the disk $c^2$ is shown in connection with the arm D, the segments $b'$, $b^7$, and $b$, the spring $a^3$ and the binding-post $G^3$ by the wires $b^8$, by which the full battery Q R S is brought in connection with the main line F, which is in connection with the arm D by the wire $b^9$. In this relation of the arm the tappet-shafts $k$ of the circuit-station instruments are passed beyond the unison-point by the force of the full battery, leaving all of said instruments in condition to be brought again to a unison-point by the working-battery Q R by rotating the arm D over the disks $c$, as before stated. In the relation of the parts shown in Fig. 14 the transmitter has another function, but in connection with the working-battery Q R, as shown in Fig. 15, in which it will be seen the said arm D is in connection with the binding-post $G^2$ by the wire $b^6$, the segments $b'$, $b^2$, and $b^{10}$, and the springs $a$ and $a^3$, the said arm being in connection with the main line F by the wire $b^9$, so that by depressing the button $B^2$ the said springs will be joined, thereby disconnecting the full battery Q R S as used in Fig. 14 and connecting the working-battery Q R with the line, for preventing the tappet-shafts of the instruments that are in unison from passing such point while rotating the arm D over the disks $c$ for bringing those instruments that may be out of unison up to the unison-point.

The push-button $B^2$ is operated, as stated, only when it is thought any of the instruments are out of unison.

It will be understood that all the disks $c$, and including the disks $c^3$ and $c^4$, are used for propelling the tappet-shafts by the working-battery Q R, with which they are connected, by rotating the arm D, passing over them, as before stated, the designation of the disks $c^3$ and $c^4$ being made merely to indicate the position of the arm D between such disks, as shown by dotted lines in Fig. 1, when all the ground-connections are made at the circuit-stations.

Figure 16:
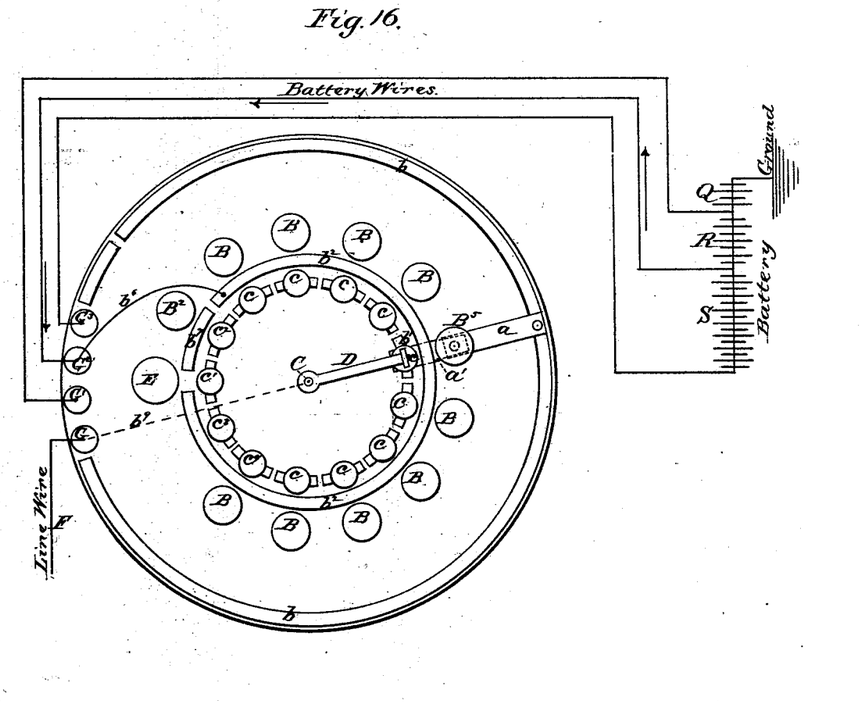
Fig. 16 represents a similar view, showing the electrical relation of the disk $c$, in connection with the segments $b'$, $b^2$, and $b$, the springs $a$ and $a'$, the rotating arm D, and one of the buttons B for operating the tappet-shafts $k$ of all the circuit-station instruments by rotating the said arm over said disks, and in which the depression of any one of said buttons B will ring the call at the desired station.

In Fig. 16 the arm D is shown in connection with one of the disks $c$ and the working-battery Q R by the segment $b'$, spring $a'$, segment $b^2$, wire $b^6$, and the binding-post $G^2$, and this connection is to show that said arm may be connected with such battery by any one of the disks, except the disks $c'$ and $c^2$, for the purpose stated. In this operation the push-button B, when depressed, joins the springs $a$ and $a'$, thereby disconnecting the working-battery Q R and connecting the full battery for the purpose of ringing the call without breaking the continuity of the line. In both of these operations the arm D is in connection with the main line F by the wire $b^9$ and the binding-post G. All these operations are effected by rotating the arm D, and by the proper manipulations of the buttons B and $B^2$, as set forth.

I have stated that the circuit-closer 3 is lifted in the course of the back stroke of the pendent propelling-arm K and is dropped by the forward stroke of the armature. The lifting of the circuit-closer 3 by the back stroke of the propelling-arm is for the purpose of bringing it in contact with the insulated spring 6, for connecting the switch-lever with the ground-wire to make the ground-connection, and while there is no battery on the line, and the dropping of the circuit-closer by the forward movement of the propelling-arm K takes place when the battery is again applied, for the purpose of disconnecting the switch from the ground-wire, and thus breaking the ground-connection. This back movement of said arm K is produced by the spring $e$, and this backward action of the arm K is essential to complete the propelling movement of the tappet-shaft by rotating the ratchet-wheel L one-half tooth, and thus give the tappet-shaft a continuous rotation.

The ground-connections are made at each and all the circuit-stations at the same time, for the purpose of allowing any one of the circuit-stations to use the ground-wire. This is done when the battery is disconnected at the main office, and after all the bells are shunted out, and by the back movement of the propelling-arm K, bringing the circuit-closer 3 in contact with the insulated spring 6, as before stated.

The effecting of the unison of all the circuit-station instruments is done by the operator depressing the push-button $B^2$, which disconnects the whole battery and connects its sections R and Q, after which the arm D is caused to revolve, and in passing over in contact with the disks the several instruments are brought to an initial point, but cannot pass it until the arm is again brought in contact with disk $c^2$ after the button $B^2$ is released.

It is obvious that the number of teeth in the wheel L and the push-buttons of the transmitter must correspond to the number of stations; but the wheel L must also have two additional teeth to correspond with the movement of the arm D from its insulated point (shown by dotted lines in Fig. 1) to the normal point, and from there to pass the unison-point $c^2$, the movement given the wheel by these additional teeth being equal to the movement of the arm between the points stated.

The circuit-calling apparatus is inclosed in a case or cover, the bell and the magneto-indicator only being exposed.

Having described my invention and the manner in which it may be carried into effect, I claim—

1. The combination, with a telephone or telegraph line, of a call apparatus located at the circuit-station, and having the pivoted circuit-closer 1, its insulated contact-point 4, operated by mechanism consisting of the tappet-shaft $k$ 11, the driving-lever K $l$, engaging with the toothed wheel L on said tappet-shaft, connected with said lever, the retracting-spring $e$, the magnet M, its armature H, and the transmitter A, and battery-sections Q and R, located at the main station, whereby the bell is shunted out and cut in in the main line at all the stations solely by said transmitter and the battery-sections, all constructed for co-operation substantially as herein set forth.

2. The combination, with a telephone or telegraph line, the battery and transmitter located at the main station, of a call apparatus located at the circuit-station, and having a single circuit-closer, 2, a single fixed insulated contact-point, 5, for said circuit-closer, the shaft $k$, with the tappet 12 for operating the same, the magnet M, and the armature H, the circuit-closer and its insulated contact-point being connected by the wires 14 and 8, and arranged to form a shunt around the push-button I and the telephone, the said tappet-shaft being operated by mechanism constructed substantially as described, whereby the telephone and the push-button of the instruments at each station on the line are shunted out simultaneously, thereby preventing any interference to the proper operation of the circuit-instruments by opening any one of the said push-buttons or interposing the resistance of any one of the said telephones during the operation of calling a station.

3. The combination, with a telephone or telegraph line, of a call apparatus located at the circuit-station, and having the circuit-closer 3, its insulated contact-spring 6, and operated by mechanism substantially such as described, and the transmitter A, and the battery-sections Q and R, located at the main station, whereby the connections between the ground switch-lever J and the ground-wire 10 are placed beyond the control of the circuit-stations and under the control of the operator at the main station, all constructed for co-operation substantially as herein set forth.

4. The combination, with a telephone or telegraph line, of a call apparatus having a unison mechanism consisting of the tappet-shaft $k f$, the pivoted arm N, the adjustable spring $g$, the set-screw $h$, the driving-lever K, operating said tappet-shaft by the magnet M, its armature H, and retracting-spring $e$, and the transmitter and batteries located at the main station, whereby all the circuit-instruments that may be out of unison are adjusted to an initial point by the operator at the main station, substantially as herein set forth.

5. The combination, with a telephone or telegraph line, of a call apparatus located at the circuit-station, and provided with mechanism for shunting out and cutting in the bell in the main line through the circuit-closer 1 and the contact-point 4, of mechanism for shunting out and cutting in the push-button I through the circuit-closer 2 and the contact-point 5, of mechanism for breaking and making the ground-wire 10 through the circuit-closer 3 and insulated contact-spring 6, and of mechanism for effecting the unison of all the circuit-station instruments, all being under the control of the transmitter and batteries at the main station, substantially as and for the purpose herein set forth.

6. The combination, with a telephone or telegraph line and a call apparatus located at the circuit-station, and constructed substantially as herein set forth, of a transmitter located at the main station, and having a series of push-buttons, B, the contact-springs $a\ a'$, upon which they act, a series of insulated disks, $c$, an arm, D, revolved over and in contact with said disks, and the metallic segments $b\ b'\ b^2\ b^3\ b^7$, for connecting such disks with the batteries, substantially as herein described.

7. The combination, with a telephone or telegraph line and a call apparatus located at the circuit-station, of a transmitter provided with the revoluble arm D, the insulated disk $c^2$, the push-button $B^2$, its contact-springs $a\ a^3$, and the segments $b\ b'\ b^7$, and the batteries connected with said springs, said push-button, when at rest, leaving the spring $a^3$ in contact with segment $b^2$, bringing in operation the large battery for the purpose of passing the shafts $k$ of all the instruments beyond the unison-stop, and when said button is depressed to connect said springs disconnecting the whole battery and connecting the two sections of the battery Q and R, for the purpose of preventing the tappet-shafts from passing the unison-point while the arm D is making one revolution, substantially as herein set forth.

8. The combination, with the call apparatus at the circuit-station, constructed substantially as herein set forth, of a transmitter having a series of push-buttons, B, corresponding to the numbers of the circuit-stations, their spring contact-points $a\ a'$, the insulated disks corresponding thereto, and the revoluble arm D, operating in connection therewith, as described, of the combined battery Q R S, whereby the depression of any one of said buttons connects said combined batteries with the line and rings the call or gives the signal to the circuit-station designated by said button.

9. The combination, with a telephone or telegraph line, a call apparatus located at the circuit-stations, and a transmitter located at the main station and having a revoluble arm, D, a series of concentric insulated disks, over and in contact with which said arm revolves, and a series of corresponding concentric push-buttons, B, arranged on the top of said transmitter, substantially as described, of metallic segments and contact-springs, arranged on the under side of said transmitter and connecting said disks with the battery, while said arm connects said disks with the line, substantially as and for the purpose herein set forth.

10. The combination, with a telephone or telegraph line, a transmitter, and a battery located at the central section, of a series of pivoted circuit-closers, 1, 2, and 3, their insulated contact-points 4, 5, and 6, and mechanism for operating said circuit-closers located in the call apparatus, the said mechanism being solely operated and controlled by the battery and transmitter at the main station, substantially as and for the purpose herein set forth.

11. The combination, with a telephone or telegraph line, a transmitter, and a battery at the main station, constructed substantially as herein set forth, of a series of pivoted circuit-closers, 1, 2, and 3, respectively operated by the tappets 11 and 12 on the shaft $k$, and the unison device consisting of the pivoted arm N, operated by the tappet $f$ on said shaft and controlled by the spring $g$ and set-screw $h$, and the propelling-lever K for operating said tappet-shaft, all located in the call apparatus and operated and controlled by said transmitter and battery, substantially as and for the purposes herein set forth.

12. The combination, with the circuit-closers 1, 2, and 3 and their insulated contact-points 4, 5, and 6, of the shaft $k$, provided with the tappets 11 and 12 for operating said circuit-closers, and the toothed wheel L, operated by the driving-lever K $l$, which is itself operated by the armature H and the magnet M and the retracting-spring $e$, all constructed for co-operation substantially as herein set forth.

13. The combination, with the tappet-shaft $k$, its toothed wheel L, the circuit-closers, the unison pivoted arm N, and the driving mechanism for said tappet-shaft, consisting of the lever K, magnet, armature, and spring $e$, constructed for operation substantially as set forth, of the check ratchet-wheel $m$ on said tappet-shaft and the pawl $n$, said ratchet-wheel having double the number of teeth of the driving-wheel L, whereby the tappet-shaft is held in position after being driven a half-tooth at each vibration of the driving-lever, such half-tooth movement being necessary to release the circuit-closers for shunting out the bells and making the ground-connection while the battery at the main station is disconnected, substantially as described.

In testimony whereof I have hereunto set my hand this 3d day of October, A. D. 1879.

ANTHONY M. FRANKENBERG.

Witnesses:
C. H. SLICER,
A. E. H. JOHNSON.